July 7, 1970  R. P. CROWLEY  3,519,527
EMBOSSED PLASTIC SURFACE COVERINGS AND METHOD
OF PREPARING SAME
Filed July 21, 1966

INVENTOR.
RICHARD P. CROWLEY

United States Patent Office 3,519,527
Patented July 7, 1970

3,519,527
EMBOSSED PLASTIC SURFACE COVERINGS AND
METHOD OF PREPARING SAME
Richard P. Crowley, Milton, Mass.
(23 Salem Road, Wellesley, Mass. 02181)
Continuation-in-part of application Ser. No. 541,100,
Apr. 8, 1966, now Patent No. 3,453,171, dated
July 1, 1969. This application July 21, 1966, Ser.
No. 566,810
Int. Cl. B32b 5/18, 3/26
U.S. Cl. 161—120                                22 Claims

ABSTRACT OF THE DISCLOSURE

A laminated sheet material having an embossed surface design comprises a first sheet composed of a noncellular sheet material having predetermined areas of differential resistance to deformation and a second sheet composed of a cellular thermoplastic sheet material, one surface of which is bonded to said first sheet.

My invention relates to embossed, cellular, polymeric laminates or surface coverings and in particular concerns a method of producing a cellular, thermoplastic surface covering having an embossed relief pattern thereon and to the sheet laminates so produced. This application is a continuation-in-part of my U.S. patent application Ser. No. 541,100 filed Apr. 8, 1966, now U.S. Pat. 3,453,171, issued July 1, 1969.

My parent application is concerned with a method of preparing chemically embossed, polymeric surface coverings such as vinyl chloride resin embossed floor tile. This method avoids some of the difficulties of the prior art associated with altering the decomposition temperature of a blowing agent, by employing a hardening agent to selected surface areas of a gas-expandable sheet material. My present invention relates to a method of preparing chemically embossed laminated sheets which method provides a more flexible and simplified means of producing an embossed design on a multiple laminate sheet. My present invention provides for the alteration, modification or changing in the thermoplastic properties of one thermoplastic sheet material in particular areas. This treated sheet material is then laminated, bonded or otherwise secured to another thermoplastic, gas-expandable sheet material, e.g., one which is capable of being expanded upon the application of heat by the decomposition of a chemical blowing agent contained therein. Either sheet material may be prepared by casting, calendering, extruding or other methods. Typically, the treated sheet material may be a thin, 1 to 50 mils wear-resistant top coating such as a transparent vinyl chloride sheet material, while the base material may be a gas-expandable, polyvinyl chloride sheet material which on expansion has a thickness of 20 to 200 mils.

My present invention provides a method which avoids some of the difficulties and problems in production often associated with the modification of the decomposition temperature of the agent in the gas-expandable thermoplastic sheet material. In my method one sheet material component of the laminate is treated with an agent which changes the plastic properties of the sheet in a particularly designated area and then held for use when and where desired in the production of the laminate sheet. In addition, the composition of the gas-expandable sheet material may be varied without substantial regard for the alteration of the decomposition temperature of the blowing agent contained therein. Since the treated areas of the thermoplastic sheet material of the multiple ply laminate creates the embossed effect desired, special treatment of the gas-expandable sheet material is not required.

My improved method provides a particular advantage in that with gelled, gas-expandable plastisol layers of polyvinyl chloride, critical factors such as the nature of the solvent and inhibitor, the degree of gellation of the resin, and the time and place of application often do not retain their critical nature as in prior practice.

In my prior method the temperature at which the hardening agent acts must occur at or below the decomposition temperature of the gas-expandable sheet. However, my present invention avoids this limitation, since any temperature can be used due to the lack of blowing agent in the first sheet material. My method is, therefore, particularly advantageous where an agent used to treat the surface acts at or above the temperature of gas expansion of the base or second sheet material.

It is an object of my invention to provide a means of preparing a multiple, polymeric, cellular laminate sheet material having an embossed surface design thereon.

A further object of my invention is to provide a simplified method of preparing a laminate sheet material such as a vinyl chloride floor tile or surface covering material which avoids many of the problems of the prior art, and which does not require a modification in the decomposition temperature of the blowing agent in the gas-expandable sheet.

An additional object of my invention is to provide a method of preparing multiple ply, thermoplastic laminates containing at least one cellular layer, for example, the preparation of a floor tile having the cellular base with a printed surface thereon, and a wear-resistant, transparent top layer characterized by an embossed surface effect. Other objects and advantages of my invention will be apparent to those persons skilled in the art from the following description of my invention taken in conjunction with the drawing wherein.

Figure 1:
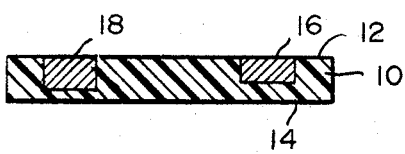
FIG. 1 is a fragmentary, cross-sectional view of a schematic illustration of a treated thermoplastic layer.

Briefly, my invention comprises altering, modifying or otherwise varying the plastic properties of certain areas of a first thermoplastic sheet material prior to the substantial expansion of an underlying base or second gas-expandable, thermoplastic sheet material to which the first sheet is laminated or bonded, thereby varying the degree of expansion of the laminate surface and creating an embossed surface on the cellular laminate sheet. The variation of the thermoplastic properties of the first sheet may be accomplished in the predetermined areas in any fashion such as, for example:

(1) Increasing the thermoplastic properties in the areas to make the area more susceptible to expansion than the surrounding areas;

(2) Increasing the thermoset properties in the area to inhibit or prevent expansion in these treated areas;

(3) A combination of these steps in different areas or surfaces of the first sheet to create a variation in embossing and the depth of expansion of the underlying gas-expandable base thermoplastic sheet material; or (4) Varying the decomposition temperature of the blowing agent in certain areas of the gas-expandable sheet material by prior practices in combination with the steps of 1, 2 or 3.

The thermoplastic properties of the sheet areas may be increased by techniques to preferentially soften certain areas such as by the use of heat, radiation energy, liquid organic solvents, solvent vapors, gases, non-volatile liquids like plasticizers, soaps, lubricants, oils and the like. The thermoplastic sheet may have areas treated to create or enhance thermoset properties, e.g., made more resistant to solvents, increased mechanical and tensile strength, increased cross-linking within the polymer, or more resistance to change in flow or properties by heat. Hardening or modifying agents may be used to treat the surface and underlying surface areas to provide thermoset properties. Typical curing, cross-linking or modifying agents or treatments may be used to cure or cross-link or alter the properties of the thermoplastic polymer, its plasticizer, resin or other additives or other ingredients of the first thermoplastic sheet material. The hardening agents may be applied directly in liquid, vapor, gas or radiation energy form. Hardening agents may include but are not limited to nitrile compounds, azo compounds, peroxides, metal soaps, and polymerized resins or polymerizable monomers and other materials such as free-radical forming or generating compounds.

Agents to change the plastic properties of the first sheet may be applied directly to one or more surfaces or in a solvent solution, a non-volatile or volatile plasticizer solution or dispersion or as a part of an adhesive or tie-in coat, or dissolved or dispersed in a printing ink composition. Typically, the agents are applied in liquid form to one of the flat surfaces of the sheet prior to lamination.

The treated first sheet may be employed directly after alteration of its area properties or stand-in roll, sheet or other form for subsequent use by the process or as needed. One or both surfaces may have the same or different or particular areas so treated. The properties of the sheet area treated may have the thermoplastic properties altered or modified uniformly or non-uniformly through the entire depth of the sheet material or to a predetermined depth depending upon the degree of embossing or other effects desired in the laminate. Typically, the depth of the area treated should be sufficient to modify the full expansion of the sheet, but not sufficient to alter the required properties of the opposite side which may be desirable to secure the first sheet to the base sheet. The first sheet may be secured to the base sheet by lamination under heat or pressure or both, by adhesives or tie-in coats, or the like. Prior to, after, or with the preparation of the laminate sheet, the flat sheet surfaces of the first or base sheets may be printed with an ink composition or other surface treatment carried out. Decorative and other effects can be obtained by the use of a thin, thermomoldable sheet of paper, plastic, metal foil of ½ to 10 mils placed between the first and base sheet prior to bonding to form a multiple ply laminate. Glass fiber, asbestos or felt or a woven or non-woven sheet may be bonded to the lower surface of the base sheet. Surface printing is usually best carried out on the flat surfaces prior to expansion with a bonding ink or ink compatible with the printing surface.

For example, a different treatment depth on the same first sheet may be created by one and/or different treating agents used to create varying embossing or design effects. Where the first sheet is to be laminated by heat or heat and pressure to the base sheet, the laminating surface should not be substantially altered in thermoplastic properties required for such lamination.

The first and base sheets may be formed in any manner such as by casting, calendering, extruding, molding, or the like. The first sheet should be thermoplastic within the gas-expandable temperature range of the base sheet particularly where the sheets comprise thermoplastic resins of substantially different properties or materials. For example, where a substantially similar vinyl chloride resin is used for both the first and base sheet, the first sheet will be plastic at about or prior to the decomposition or expandable temperature of the base sheet and thus act as a part of the base sheet in expansion except for the treated areas. Generally, the first sheet should be thermoplastic over the temperature range of the base sheet, particularly over the temperature range at which expansion of the base sheet will occur. The first sheet material may be laminated to one or both surfaces of an expandable base sheet. The first sheet may typically be a thin (e.g., 1 to 30 mils) sheet used as a wear-resistant or decorative top surface covering, such as transparent sheet material. The base material on expansion may have a thickness of 10 mils or more, e.g., 10 to 150 mils, depending upon the end use of the laminate such as for clothing, floor tile, wall or furniture covering, etc.

FIG. 1 shows a first thin transparent thermoplastic sheet of a transparent vinyl chloride resin 10 having a top 12 and lower 14 surface and containing treated areas 16 and 18 of different treatment depths. The treated areas are schematically illustrated as rectangular blocks for the purposes of illustration only. The treated area represents areas which have been treated with an organic solvent solution, e.g., methyl ethyl ketone and toluene or a plasticizer like dioctyl phthalate containing 10% dietertiary butyl peroxide and the sheet heated to 100–150° C., so that the treated areas are more thermoset in properties due to cross-linking of the vinyl resin by the cross-linking agent. Non-volatile plasticizer composition containing a cross-linking agent is particularly useful in embossing vinyl chloride resin sheets wherein the plasticizer is compatible with the gelled resin layer.

Figure 2:
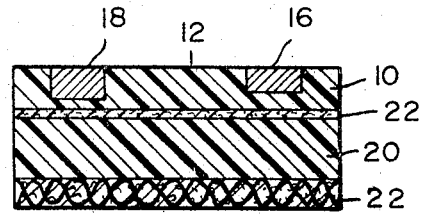
FIG. 2 is a fragmentary, cross-sectional view of a multiple laminate prior to expansion employing the treated layer of FIG. 1.

FIG. 2 shows an unexpanded laminate sheet comprising a base fibrous sheet 22, e.g., a fiber glass screen embedded in the lower base surface of a thermoplastic vinyl chloride base sheet 20 containing a blowing amount of azodicarbonamide as a blowing agent. The top flat surface of the base has been printed with a design shown as vinyl chloride ink layer 22, while laminated to the base sheet 22 and the ink layer 22 is the bottom thermoplastic surface 14 of the first treated sheet 10.

Figure 3:
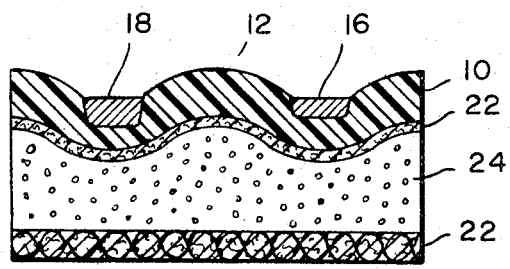
FIG. 3 is a fragmentary, cross-section view of the multiple ply laminate of FIG. 2 after expansion.

FIG. 3 shows the laminate sheet after being heated to a temperature, e.g., 180–200° C., sufficient to decompose the blowing agent and create a cellular base sheet 24. Due to the treated areas 16 and 18, the base sheet is inhibited in full expansion in these treated areas, while the surrounding areas are raised due to full expansion. Such inhibition of expansion in particular areas changes the nature of the underlying cellular structure of the base sheet 24. In this manner the decomposition temperature of the blowing agent in the base sheet need not of necessity be changed to obtain a surface embossed laminate, but may be if desired.

Figure 4:
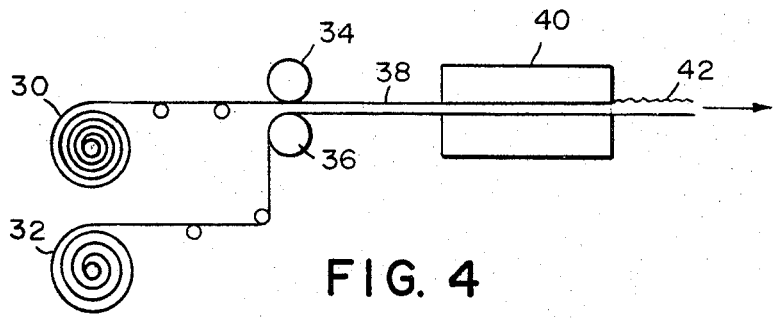
FIG. 4 is a diagrammatic representation of one method of preparing laminates employing two thermoplastic sheet materials.

FIG. 4 shows a roll 30 of a first treated sheet material like 10 and a roll 32 of a base gas-expandable thermoplastic sheet like 20 being passed through a pair of opposing heated pressure rolls 34 and 36 to accomplish lamination of the respective sheet surfaces to each other. In this method the sheet material 20 may be a calendered, gas-expandable sheet prepared as set forth in U.S. Pat. 2,964,799, issued Dec. 20, 1960. The laminate sheet 38 is then passed through a hot air oven 40 where it is heated to a temperature to decompose the blowing agent and create a cellular laminate 42 having a surface embossed design.

Figure 5:
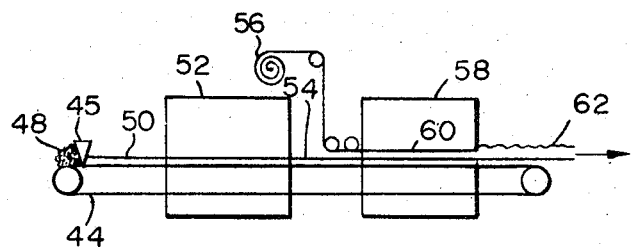
FIG. 5 is a diagrammatic illustration of a means of preparing a multiple ply laminate of my invention by employing a treated sheet material and a gelled plastisol or organosol sheet material.

FIG. 5 shows another method of preparing a surface embossed cellular laminate sheet wherein the base sheet is first formed by casting and gelling. A vinyl chloride plastisol 48 containing a blowing agent is spread by a doctor blade 46 or other means into a thin film 50 (e.g., 10 mils) on an endless belt surface 44. The cast film is heated in oven 52 to a temperature of less than the decomposition temperature of the blowing agent, e.g., usually less than 150° C. (e.g. 80–125° C.) for a time sufficient to form a semi-rigid or gelled layed 54. A roll 56 of a first treated thermoplastic sheet like 10 is then pressed into surface contact with the flat, gelled, tacky surface of layer 54 and the laminate sheet 60 so formed gradually heated in oven 58 (e.g., 150–210° C.) to bond and fuse the laminate surfaces and to decompose the blowing agent in the base sheet thereby creating a cellular surface embossed laminate sheet 62.

My hardening agents may include a wide variety of compounds depending on the polymeric nature of the first sheet material to be treated. Compounds which form free radicals by heat, chemical decomposition or photochemical reaction may be used. Such compounds include organic peroxides, organic hyperperoxides, peresters of organic acids, certain azo derivatives and inorganic persulfates. Azo nitriles and substituted azo nitriles (U.S. Pat. 2,471,959) are preferred agents. Particular agents would typically include tertiary butyl peroxide, dicumyl peroxide, benzoyl peroxide, azobisisobutyronitrile, a beam of high energy neutrons, electrons, or other particles of high energy. The agents may be applied to the surface of the first sheet in a solvent or plasticizer solution. Where deep embossing, e.g. 5 to 30 mils or more in depth is desired, a solvent system should be selected which permits the hardening agent dissolved or dispersed therein to penetrate the plastic surface to a greater depth so that a greater depth of thickness of the plastic material is modified. Typical organic solvents which may be employed include alcohols, ethers, ketones, aldehydes, esters, hydrocarbons and the like. Diluents such as toluene, cyclohexane, petroleum naphtha, xylene and the like may be used with the solvent. A highly active solvent such as methylethyl ketone, acetone or tetrahydrofuran, cyclohexanone, and the like are preferred for vinyl chloride resins used and where good relief depressions are desirable. Good results are achieved when the solvent selected also acts as a dispersant or solvent or softening agent for the plastic or resin of the first sheet material.

My hardening agents and solvent compositions containing the agents may be printed, sprayed, coated or otherwise deposited on one or both surfaces of the first sheet material, preferably while the thermoplastic sheet material has a flat, smooth top surface, i.e., prior to any embossed pattern being created thereon.

Where the first sheet material is a flexible, natural or synthetic elastomer sheet material subject to hardening by cross-linking or curing, typical curing agents like sulfur, sulfur compounds, metal salts like zinc oxides, monomers and the like may be used in treating the designated area.

In addition, my treating agents include the use of a beam of atomic or sub-atomic charged or neutral particles, i.e., radiation to modify the thermoplastic sheet. For example, the polymeric first sheet material may be irradiated in a particular design. A polyolefin resin like thin ployethylene or polypropylene resin or a vinyl resin may be irradiated with a beam of charged electrons or particles from a radioactive source or a Van der Graaf generator for a time sufficient to cross-link or modify the resin properties. The particular design to be embossed may be formed in a lead or other radiation imperforate shield placed between the sheet and the radiation source.

Another means to alter the expansion properties includes making particular areas more thermoplastic in nature. Typical agents which may be used include the application of or exposure to organic liquids or vapors to the surface in which the first sheet material is dispersable, softenable or soluble. For example, for vinyl resins typical solvents would include ketones like methyl ethyl ketone, acetone, tetrahydrofuran, nitroalkanes and alkenes, etc. Non-volatile solvents like plasticizers may be used, particularly when the plasticizer is more solvent or plasticizing in properties than the primary plasticizer used in the first sheet material. Typical plasticizers include ethers, esters and polyesters such as fatty esters of epoxidized soybean oil, azelates, sebacates, phthalates, adipates, etc. and other esters such as those obtained by the reaction of an acid, e.g., a dibasic acid, with a poly functional alcohol such as ethylene glycol, propylene glycol, fatty alcohol, etc. Particular examples would include dibutylphthalate, isooctyl phthalate, epoxidized glycol ether, organic phosphites, oils, dioctylphthalate, etc.

The thermoplastic sheet material may be any thermoplastic polymeric sheet material such as a vinyl resin like polyvinyl chloride, a vinyl chloride-vinyl acetate copolymer, a styrene resin like polystyrene, methyl-styrene copolymers, acrylonitrile-butadiene-styrene resins, a polyolefin resin like polyethylene, polypropylene, ethylene-propylene and ethylene-butene resins, acrylic resins like homo and copolymers of acrylic and methacrylic esters, polyurethane sheets, natural and synthetic elastomers and the like. For the preparation of floor tile and surface coverings the use of a wear-resistant sheet of transparent acrylic, urethane or vinyl chloride resin sheet on a gas-expandable, elastomer or vinyl chloride resin or rubber base sheet is the preferred laminate sheet.

The base sheet may be formed from any organo-plastic, gas-retentive, gas-expandable polymeric material including the polymers employed for the first sheet. Expansion of the sheet to form the cellular base may be by fluoro or chloro carbons like fluoro and chloro alkanes and alkenes such as methane and ethane, or liquified hydrocarbon like propane, butane and the like, or by a gas generated on the decomposition of chemical blowing agents like dinitroso pentamethylenetetraamine, azodicarbonamide, urea, biuret, carbonates like ammonium carbonate, hydrides, sulfonyl hydrazides and the like. The chemical blowing agents are often used in amounts of from 0.5 to 30 parts per 100 parts of resin, e.g., 2 to 15 parts.

EXAMPLE 1

A vinyl chloride floor tile is prepared by coating a gas-expandable plastisol composition onto a release paper in a thin film of about 20 mils. A typical plastisol for this use is prepared as follows:

| Ingredients: | Parts by weight |
|---|---|
| Polyvinyl resin dispersion grade | 100.0 |
| Dioctylphthalate (plasticizer) | 70.0 |
| Epoxidized soybean oil (plasticizer) | 5.0 |
| Azodicarbonamide (blowing agent) | 3.0 |
| Stabilizer (such as barium-cadmium fatty acid soap) | 3.0 |

The film is heated in a hot air oven to a temperature of about 140–150° F. for a period sufficient to produce a flat, gelled layer having a tacky, flat upper surface. A thin sheet, e.g., 2–5 mils, of a transparent polyvinyl chloride resin formed in a calendering operation is coated with a twenty percent (20%) solution of azobisisobutyronitrile in a solution of methyl ethyl ketone and toluene. The solution is applied to one surface of the sheet by a rotogravure roll containing a design which is to represent the embossed or depressed area of the laminate. The solvent is allowed time (1–2 minutes) to penetrate the sheet. The coated sheet is then heated to 200 to 220° F. to create a more thermoset design area by modifying the resin properties through the use of the peroxide agent. The non-treated surface of the calendered film is then pressed into contact with the tacky surface of the gelled resin layer and gradually heated to a temperature of 350 to 400° F. sufficient to bond the sheets together, decompose the blowing agent in the base sheet and to fuse the vinyl chloride resin of the plastisol. A cellular vinyl chloride floor laminate sheet is thus produced having a lower cellular base for resiliency and walking comfort and an upper surface having a wear-resistant layer and an embossed decorative surface effect.

EXAMPLE 2

A thin film of an acrylic resin sheet having particular areas made more thermoset than the other areas by the application of a solvent solution of tertiary butyl peroxide and heat is pressed at a laminating temperature to a thin sheet of calendered or extruded vinyl chloride resin containing a nitrogen gas generating blowing agent. The laminate sheet is then heated to a higher temperature to decompose the blowing agent in the base sheet and create a cellular embossed laminate.

EXAMPLE 3

A thin sheet of polyethylene resin is treated in certain design areas with a solution of methyl ethyl ketone containing 5% of benzoyl peroxide and heated to create cured or cross-linked areas in the thin film. This film is then laminated under heat and pressure to a thin film of the same polyethylene resin containing about 1 to 4 parts per 100 parts of resin of azodicarbonamide blowing agent, the laminating temperature being less than 180° C. The laminate sheet is then heated to about 200° C. to decompose the blowing agent and create a cellular base layer.

EXAMPLE 4

Example 3 is repeated employing a vinyl chloride resin in place of the polyethylene resin, the treated first sheet being transparent and having a thickness of 2–10 mils, and the second or base gas-expandable sheet having a thickness prior to expansion of 10–20 mils and pigmented with a very thin vinyl chloride resin decorative printing layer on the top surface.

My method also includes within the term first thermoplastic sheet the casting or coating of a first liquid resin coating onto the surface of a gas-expandable, gelled, or formed record thermoplastic sheet and the altering of the thermoplastic properties of the first coating either in liquid, gel or plastic form prior to or with the expansion of the second sheet. For example, a fabric supported second or base gelled, gas-expandable vinyl chloride resin sheet may be formed in the usual manner, and then a thin film of a vinyl chloride resin plastisol or organosol coated onto the upper surface of the gelled base layer. The coating is then heated to a temperature and for a time period sufficient to form a gelled layer bonded to the base layer. The temperature of gelling the coating should not be sufficient to substantially expand the base layer. A printing ink composition comprising a solvent, binder and pigment and containing 5–10% of a cross-linking agent, e.g., AZDN (azobis-isobutyronitrile) or a peroxide for the vinyl chloride resin of the coated layer is then used to print a decorative design onto the top gelled surface. The bonded, gelled first top and base layers are then gradually heated to about 190° C. to permit the cross-linking or curing agent to penetrate and modify the expandable plastic properties of the top layer and to expand the base layer, thereby providing a cellular laminate sheet having a printed and embossed surface effect. Accordingly, my method includes the altering, modifying or treating of the first thermoplastic sheet (in gelled or sheet form) prior to, during, or after bonding of the thermoplastic to the gas-expandable layer.

If desired another very thin, thermoplastic sheet may be coated, calendered or extruded onto the upper surface of the first sheet prior to expansion of the base material. One of the surfaces of the first sheet or the upper surface of the base sheet may be printed with an ink for decorative purposes or other alterations or modifications made in the nature or scope of the invention within the shell of those in the art.

As described, my discovery permits the preparation on a production scale of cellular laminate sheets having an embossed surface effect and a wear-resistant or decorative type surface.

What I claim is:

1. A method of forming a cellular laminate sheet characterized by an embossed surface which method comprises:
   treating a portion of one surface of a first non-cellular thermoplastic sheet free of a chemical blowing agent to provide a predetermined pattern of increased differential resistance to deformation to said sheet in the areas of treatment by strengthening said areas;
   bonding the first sheet to a second thermoplastic, gas-expandable sheet at a temperature insufficient to expand substantially the second sheet, thereby forming a laminate of said first and second thermoplastic sheets; and
   heating the laminate to a temperature sufficient to expand the second thermoplastic sheet whereby the second sheet is expanded to varying degrees due to the pattern of differential resistance to deformation of the first sheet so that areas of depression occur in the second sheet corresponding to said strengthened areas in the first sheet.

2. The method of claim 1 wherein the thermoplastic sheet comprises a polymer selected from the group consisting of vinyl chloride resin, styrene resin, acrylic resin, natural and synthetic elastomers and $C_2$–$C_4$ olefinic resins.

3. The method of claim 1 which includes treating the first thermoplastic sheet in calendered sheet form prior to bonding the first to the second sheet.

4. The method of claim 1 which includes treating one surface of the first thermoplastic sheet with a hardening agent selected from the group consisting of nitrile compounds, azo compounds, peroxides, resins, polymerizable monomers, radiation energy, peresters of organic acids, inorganic persulfates and free radical-forming compounds.

5. The method of claim 1 which includes treating one surface of the first thermoplastic sheet material with a cross-linking agent in an amount sufficient to render the treated portion of the first thermoplastic sheet more thermo-setting in properties than the untreated portion, thereby inhibiting the deformation of this sheet in this portion with respect to the rest of the sheet.

6. The method of claim 1 which includes treating one surface of the first thermoplastic sheet to a predetermined depth to render the treated portion more thermo-setting in properties than the untreated portion, but keeping the opposite surface of the first thermoplastic sheet substantially thermoplastic in properties so as to permit the laminating of the opposite surface by heat to one surface of the second thermoplastic sheet.

7. The method of claim 1 which includes treating a portion of one surface of the first thermoplastic sheet through the entire depth of the sheet so as to provide a predetermined pattern of increased differential resistance to deformation throughout said entire depth by strengthening said treated portions.

8. The method of claim 1 which includes in the treating step applying a solution containing a polymerizable monomer to preselected portions of the first sheet and polymerizing the monomer so as to render the treated portions of the first sheet more thermosetting in properties than the untreated portion.

9. The method as defined in claim 1 wherein both surfaces of said first sheet are treated to define predetermined patterns of increased differential resistance of deformation in the treated areas.

10. The method of claim 1 wherein the treating step includes incorporating a polymerizable monomer into the first sheet and applying a solution containing a cross-linking agent to the first sheet and heating the first sheet so as to polymerize the monomer and render the treated areas so polymerized more thermosetting in properties than the untreated areas of said first sheet.

11. The method of claim 1 which includes: applying to a surface of the first thermoplastic sheet, a liquid which will penetrate into said sheet, said liquid containing a monomer compatible with said sheet material and capable of addition polymerization at said temperature range in the presence of an addition polymerization catalyst; and heating said sheet material to a temperature sufficient to polymerize said monomer; thereby inhibiting the deformation of said sheet in the areas of application of said liquid, with respect to the rest of said sheet.

12. The method as defined in claim 1 wherein said differential resistance to deformation is provided by irradiating said sheet in the predetermined design pattern with a beam of atomic or sub-atomic particles.

13. The method of claim 1 wherein the second thermoplastic sheet comprises a vinyl chloride resin containing a blowing amount of azodicarbonamide, and the first thermoplastic sheet comprises a vinyl chloride resin sheet, and which method includes treating one surface of the first sheet with a liquid organic solution containing a peroxide.

14. The method of claim 1 which includes:
   coating a vinyl chloride resin plastisol onto the surface of the second thermoplastic sheet;
   heating the plastisol layer to form a laminate comprising a gelled first thermoplastic sheet bonded to the second sheet;
   treating the surface of the gelled layer to provide a predetermined pattern of increased differential resistance to deformation to the sheet in the areas of treatment by strengthening said areas; and
   heating the treated laminate to a temperature to expand the second termoplastic sheet and to fuse the vinyl chloride resin of the first sheet whereby the areas of expansion in said second sheet to correspond to the nonstrengthened areas of the first sheet.

15. The method of claim 1 wherein the first and second thermoplastic sheets are both calendered plasticized sheets containing a vinyl chloride resin.

16. A cellular laminate sheet characterized by the embossed surface produced by the method of claim 1.

17. A cellular laminate sheet characterized by an embossed surface on one surface thereof, produced by the method of claim 1, the depressed areas of the first sheet of the laminate containing a cross-linked polymer.

18. The method of forming a cellular laminate sheet characterized by an embossed surface which method comprises:
   providing a first noncellular thermoplastic sheet free of a chemical blowing agent which sheet comprises a plasticized vinyl chloride resin;
   applying to a surface of the first thermoplastic sheet in predetermined areas a liquid solution which includes a polymerizable monomer;
   polymerizing the monomer so applied to provide a predetermined pattern of increased differential resistance to deformation in said first sheet in the areas of treatment by strengthening the said areas;
   providing a second thermoplastic gas-expandable sheet comprising a plasticized vinyl chloride resin containing a chemical blowing agent;
   laminating one surface of the first and second sheets to each other at a temperature insufficient to decompose substantially the chemical blowing agent in the second sheet thereby forming a sheet laminate of said first and second thermoplastic sheets; and
   heating the laminated sheet to a temperature sufficient to decompose the chemical blowing agent in the second thermoplastic sheet whereby by the second sheet is expanded to varying degrees due to the pattern of differential resistance of deformation of the first sheet to provide an embossed surface on the cellular laminate sheet, the areas of depression in the second sheet corresponding to the strengthened areas in the first sheet.

19. The method of claim 18 wherein the first and second sheets are calendered sheets, the first sheet being transparent after forming the laminate, and the chemical blowing agent in the second sheet including azodicarbonamide.

20. The method of claim 19 which includes in the step of providing a first sheet the steps of casting a layer of a vinyl chloride resin plastisol onto the surface of the second sheet; and heating the layer to a temperature sufficient to gell the resin but insufficient to form a cellular second sheet.

21. The method of claim 18 which includes treating the predetermined areas of the first sheet with a peroxide.

22. A cellular laminate having an embossed surface produced by the method of claim 18.

References Cited

UNITED STATES PATENTS

| | | | |
|---|---|---|---|
| 2,746,940 | 5/1956 | Cooper et al. | 260—2.5 |
| 2,920,977 | 1/1960 | Adams | 117—15 |
| 3,239,365 | 3/1966 | Petry | 117—11 |
| 3,293,094 | 12/1966 | Nairn et al. | 156—79 |
| 3,341,480 | 12/1967 | Field | 260—2.5 |
| 3,365,353 | 1/1968 | Witman | 116—116 |
| 3,399,106 | 8/1968 | Palmer et al. | 161—160 X |

JOHN T. GOOLKASIAN, Primary Examiner

C. B. COSBY, Assistant Examiner

U.S. Cl. X.R.

117—93.31, 138.8, 161; 156—79; 161—160; 264—47, 54